UNITED STATES PATENT OFFICE.

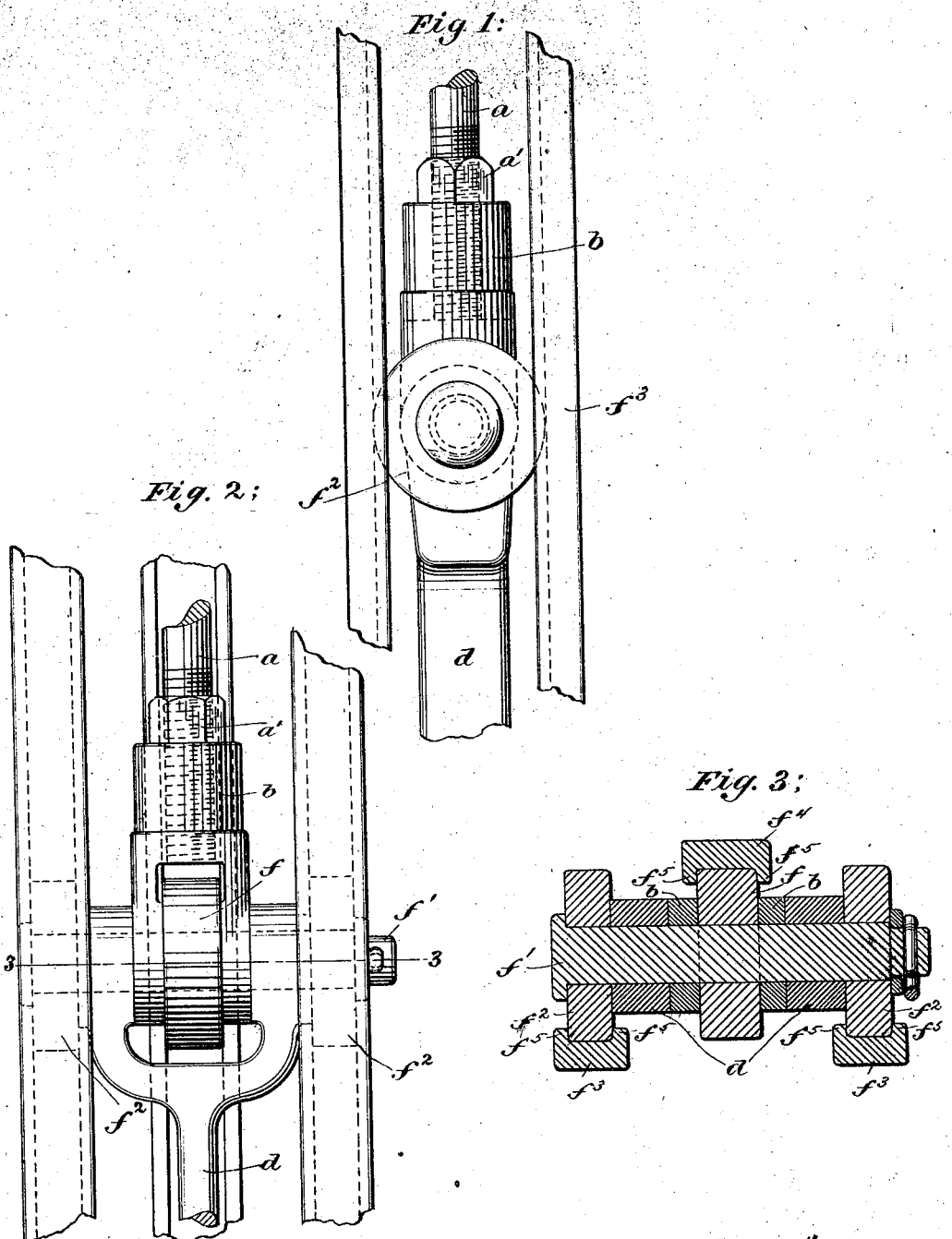

GEORGE E. WHITNEY, OF BOSTON, MASSACHUSETTS, ASSIGNOR, BY MESNE ASSIGNMENTS, TO STANLEY MOTOR CARRIAGE COMPANY, A CORPORATION OF MASSACHUSETTS.

ENGINE.

No. 860,174.

Specification of Letters Patent.

Patented July 16, 1907.

Application filed August 28, 1902. Serial No. 121,294.

*To all whom it may concern:*

Be it known that I, GEORGE E. WHITNEY, a citizen of the United States, residing at Boston, in the county of Suffolk and State of Massachusetts, have invented an Improvement in Engines, of which the following description, in connection with the accompanying drawings, is a specification, like letters on the drawings representing like parts.

My invention relates to engines particularly of the type wherein is employed a reciprocating piston the piston rod of which is jointed to a connecting rod which actuates a usual crank.

In Letters Patent of the United States No. 699,995 issued to me under date of May 13th, 1902, there is shown an engine wherein the cross head is provided with a guide wheel arranged to roll upon a stationary guide, thereby providing a roller bearing instead of a usual sliding bearing for the cross head. In my said patent, a plurality of cross head guide wheels were employed, arranged respectively at opposite sides of the axis of the piston rod, each of the said guide wheels being provided at its opposite sides with stationary guides whereby the same wheels served to guide the piston in both directions of rotation of the crankshaft.

My present invention aims to provide a wheel cross head or guide of the general type shown in my said patent, but so constructed that the wheel or wheels which guide the piston when the engine or crankshaft is operating in one direction will be independent of or separate from the wheel or wheels which guide the same piston with the engine or crankshaft operating in a reverse direction.

My invention will be best understood from a description of one embodiment thereof, shown in the accompanying drawings, wherein,—

Figure 1 in side elevation shows a wheel guide or cross head with its accompanying stationary guides made in accordance with my invention; Fig. 2 is a right-hand face view of Fig. 1; and, Fig. 3 is a cross section on the dotted line, 3—3, Fig. 2, through the axis of the wrist pin.

Referring to the said drawings, in the particular embodiment of my invention therein illustrated, $a$ is the piston rod of a usual cylinder, shown as threaded at its lower end and screwed into a cross head, $b$, the piston rod being held by a lock nut, $a'$. The cross head is forked at its middle to receive the guide wheel, $f$, the same being mounted in suitable manner upon the wrist pin, $f'$, carried in and by the said cross head. The ends of the wrist pin are extended respectively beyond the said cross head to receive and serve as bearings for the forked end of the connecting rod, $d$, which actuates the crank in usual manner, the said ends being yet further extended to receive and support the guide wheels $f^2$. As herein shown the wrist pin, is fast in the cross head, and the connecting rod and guide wheels rotate loosely thereupon; but obviously, the said wrist pin might be carried fast in the end of the connecting rod and rotate in the cross head and the wheels. In this respect, my invention is restricted to no especial construction, nor is it restricted to any particular form of bearing or bearing surface or means for adjusting or taking up the same.

Referring particularly to Fig. 3, I have provided at one side of the cross head, as at the right, Fig. 1, stationary guides $f^3$, in contact with which the outside guide wheels, $f^2$, roll when the engine is operating in one, for example, a forward direction. I have provided at the opposite side of the cross head a single guide, $f^4$, against which the middle guide wheel, $f$, rotates when the engine is operating in a reverse direction. All the guides are provided with lateral guide walls, $f^5$, to hold the piston in lateral alinement. Thus, when the engine is rotating in a forward direction with the wheels $f^2$ in contact with the guides $f^3$, should the reverse guide wheel, by reason of closeness of adjustment or otherwise, be in contact with its guide, $f^4$, it is free to roll thereupon without retarding the cross head and without undue friction, such as might occur on too close adjustment with the cross head in my said patent where the same wheel operates between guides arranged at its opposite sides. My present invention, therefore, obviates a possible difficulty that might arise with the construction illustrated in my said patent, although in practice the latter is so adjusted as to leave always a slight clearance at the side of the guide wheel, which is in operative contact with its guide.

My invention is not limited to the particular embodiment thereof here shown and described, but obviously may be varied within the spirit and scope of my invention.

Having described my invention and without limiting myself to details, what I claim and desire to secure by Letters Patent is,—

1. The combination in an engine of a piston rod, a connecting rod, a wrist pin joining the two, guide members on opposite sides of the wrist pin axis, and a plurality of co-axially mounted guiding wheels for engagement with said oppositely located guiding members, at least one of said guiding wheels engaging one of said guiding members only.

2. The combination in an engine of a piston rod and connecting rod, a wrist pin joining the two, a plurality of guiding wheels to guide said wrist pin and guiding members on opposite sides of the wrist pin axis, one of said guiding wheels engaging a guiding member at one side the wrist pin axis only and another guide wheel engaging a guiding member on the opposite side only.

3. The combination in an engine of a piston rod, a connecting rod, a plurality of guide wheels having co-incident axes, and connected with and moved by said piston rod, and guiding means for one of said wheels only at one side of the axis thereof for guiding the piston with the engine running in one direction and guiding means for another of said wheels at the opposite side of the said piston for guiding the piston with the engine running in a reverse direction.

4. The combination in an engine of a piston rod, its connecting rod, and wrist pin joining the two, three guide wheels mounted upon said wrist pin, and three guides for the respective wheels, two of the said guides being arranged at one side of the said wrist pin to operate with the engine running in one direction, the third guide at the opposite side of said wrist pin to operate with the engine running in a reverse direction.

5. The combination in an engine of a piston rod and connecting rod, a wrist pin joining the two, guiding members on opposite sides of the wrist pin axis, and a plurality of co-axially mounted guiding wheels engaging each one of said oppositely located guiding members.

6. The combination in an engine of a piston rod and guiding means therefor comprising guiding surfaces and a plurality of roller guiding means arranged each symmetrically with respect to the piston rod axis, said roller guiding means having simultaneous rolling contact with the guiding surfaces one on one side of the piston rod axis, and another on the opposite side of the piston rod axis.

7. The combination in an engine of a piston rod, guiding means therefor comprising guiding surfaces on each side of the piston rod axis, and co-axially mounted roller guiding means contacting each with one of said guiding surfaces only.

8. The combination in an engine of a piston rod, a plurality of guiding means therefor, comprising co-axial roller guiding means in simultaneous contact with guiding surfaces on each side of the common axis of said first-named guiding means.

In testimony whereof, I have signed my name to this specification, in the presence of two subscribing witnesses.

GEORGE E. WHITNEY.

Witnesses:
FREDERICK L. EMERY,
RANDALL B. HOUGHTON.